Jan. 23, 1962  E. D. O'BRIEN  3,017,854
CENTRIFUGAL COATING APPARATUS
Filed March 20, 1959  6 Sheets-Sheet 1
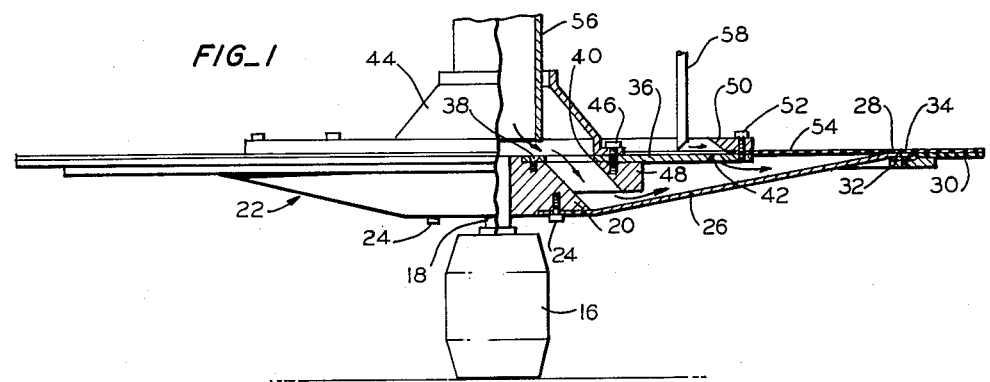
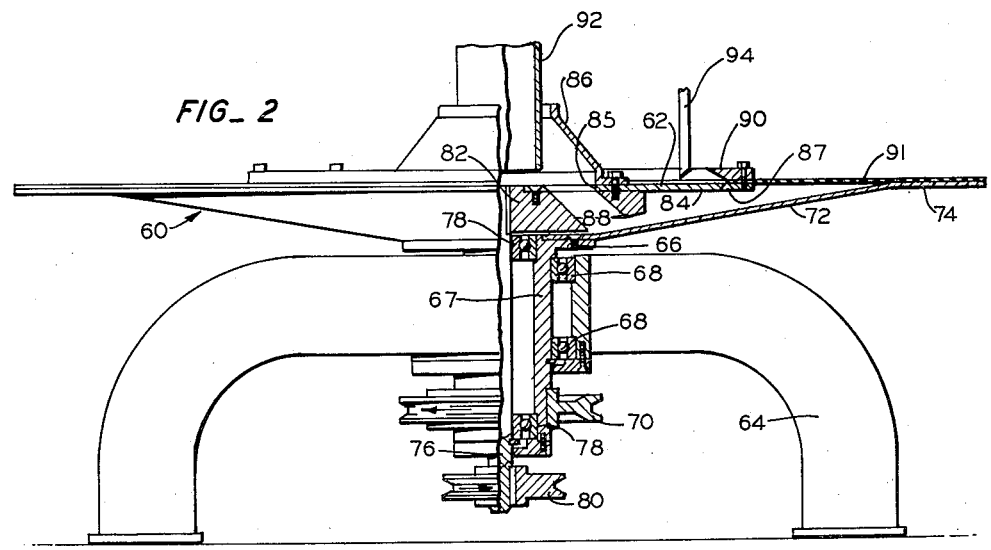
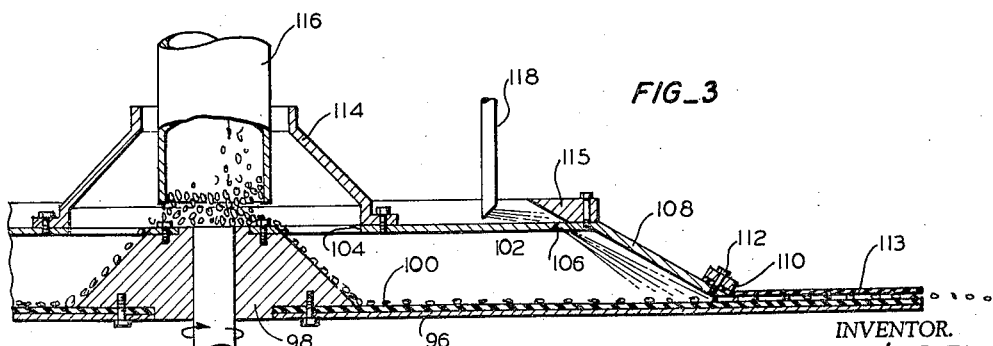
INVENTOR.
EDWARD D. O'BRIEN
BY *Naylor & Neal*
ATTORNEYS Jan. 23, 1962  E. D. O'BRIEN  3,017,854
CENTRIFUGAL COATING APPARATUS
Filed March 20, 1959  6 Sheets-Sheet 2
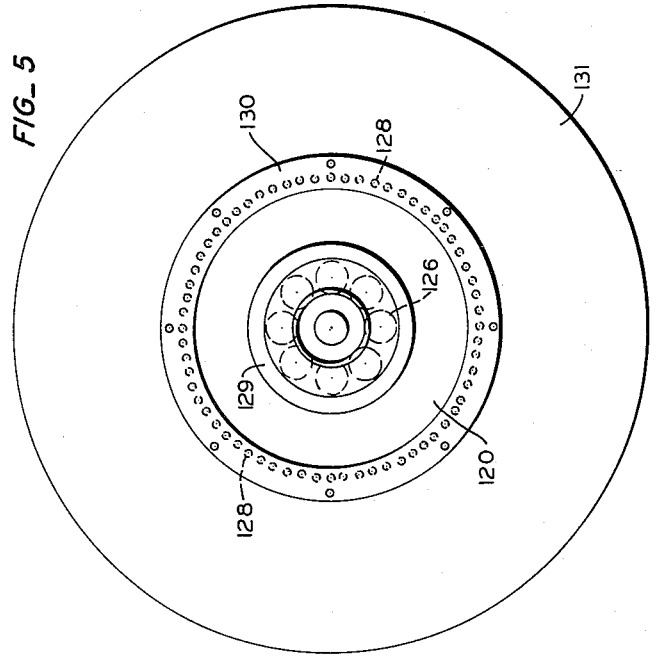
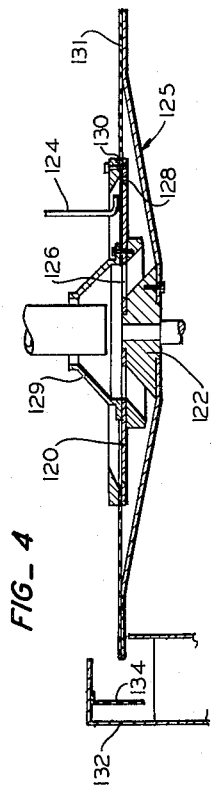
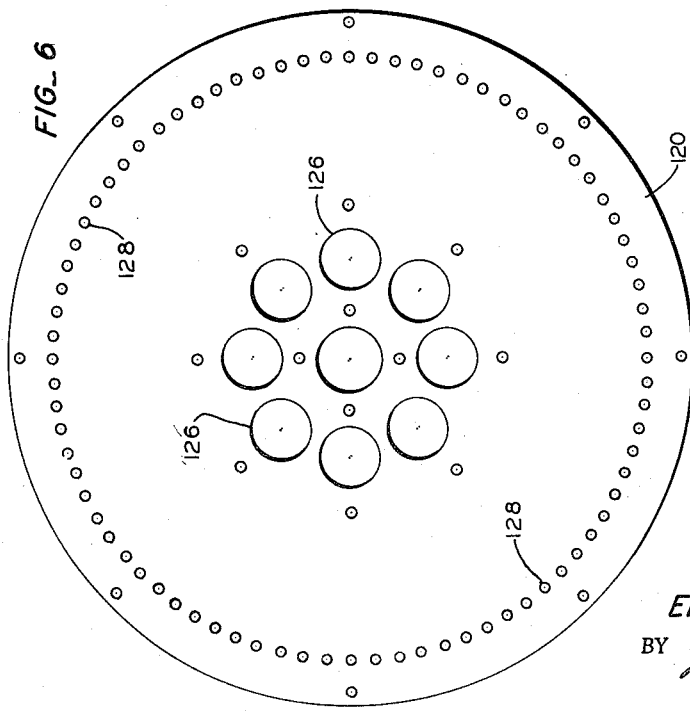
INVENTOR.
EDWARD D. O'BRIEN
BY *Naylor & Neal*
ATTORNEYS Jan. 23, 1962 E. D. O'BRIEN 3,017,854
CENTRIFUGAL COATING APPARATUS
Filed March 20, 1959 6 Sheets-Sheet 3

INVENTOR.
EDWARD D. O'BRIEN
BY Naylor & Neal
ATTORNEYS

Jan. 23, 1962 E. D. O'BRIEN 3,017,854
CENTRIFUGAL COATING APPARATUS
Filed March 20, 1959 6 Sheets-Sheet 4
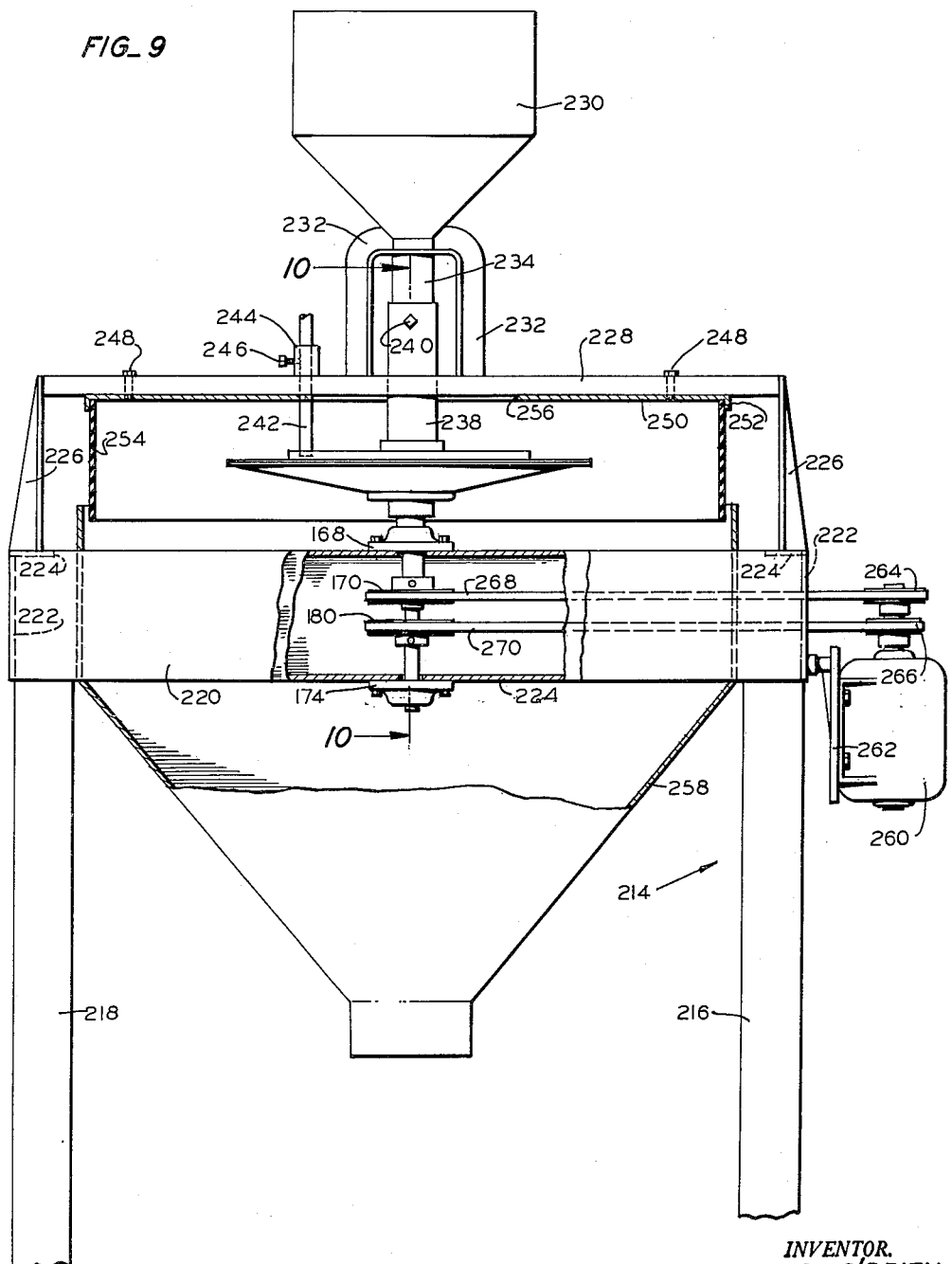
INVENTOR.
EDWARD D. O'BRIEN
BY Naylor & Neal
ATTORNEYS Jan. 23, 1962 E. D. O'BRIEN 3,017,854
CENTRIFUGAL COATING APPARATUS
Filed March 20, 1959 6 Sheets-Sheet 5
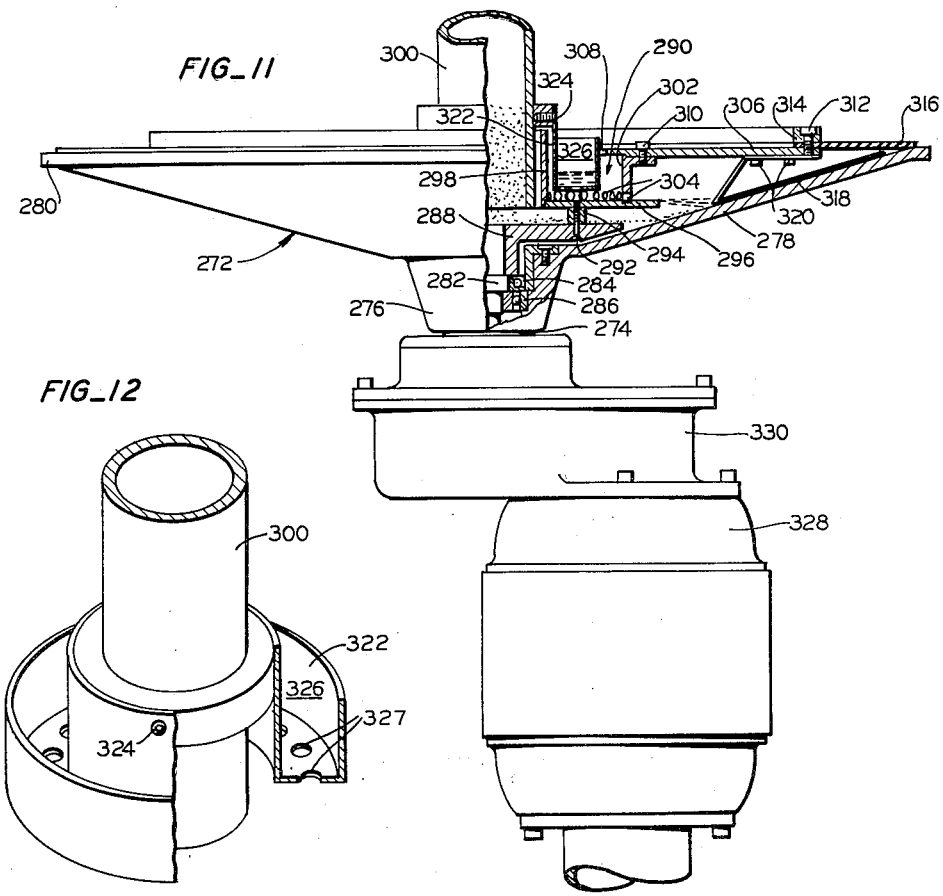
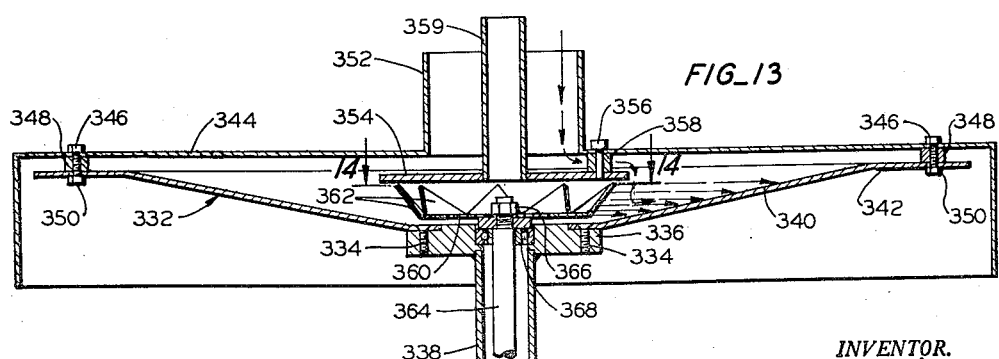
INVENTOR.
EDWARD D. O'BRIEN
BY Naylor & Neal
ATTORNEYS Jan. 23, 1962   E. D. O'BRIEN   3,017,854
CENTRIFUGAL COATING APPARATUS
Filed March 20, 1959   6 Sheets-Sheet 6
FIG_14
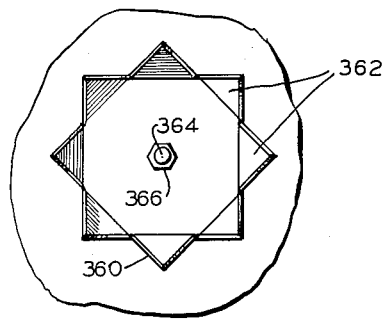
FIG_15
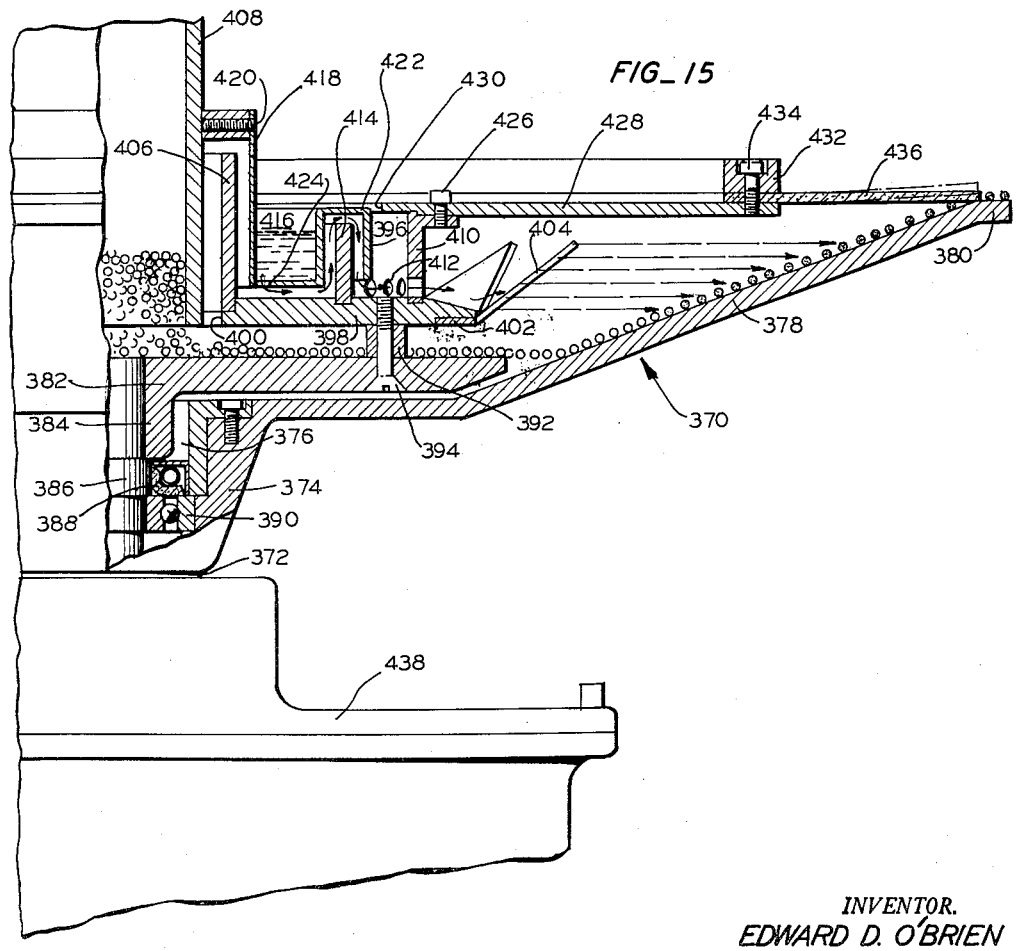
INVENTOR.
EDWARD D. O'BRIEN
BY Naylor & Neal
ATTORNEYS ବ
United States Patent Office 3,017,854
Patented Jan. 23, 1962

3,017,854
CENTRIFUGAL COATING APPARATUS
Edward D. O'Brien, 585 Woodside Drive,
Woodside, Calif.
Filed Mar. 20, 1959, Ser. No. 800,730
30 Claims. (Cl. 118—303)

This invention relates to a coating apparatus and more particularly, to a continuous operation centrifugal coating apparatus having particular application to the coating of materials of relatively fine grain and to the pelletizing of the same when desired. The invention has utility both for liquid-solid and solid-solid blending or intermixing and is particularly satisfactory for uniformly blending small amounts of liquids with large amounts of solids.

It is an object of this invention to provide an apparatus of the character described, having a high capacity of operation and capable of applying a coating material in the form of a liquid or slurry to material of granular form and of a wide variety of sizes, without effecting a build-up or agglomeration when such coating material is applied to relatively fine materials and without the turning of the same into mud.

By way of illustration, the unit of FIGURE 15 is capable of handling up to 400 cubic feet per hour of feed of a bulk density of up to 50 pounds per cubic foot thus giving a total unit capacity of up to 10 tons per hour. Empirical results indicate that for a 400 cubic foot per hour output a speed of from 900 to 1,000 r.p.m. gives the best distribution of the liquid into droplets, depth of solids on the disk, and contact time between the two feeds. Further, this speed is best for solids ranging from micron size to 20 mesh, and in some cases larger, and for liquids ranging from low to very high viscosity.

The proper speed of rotation will vary with the diameter of the particular disk or mixing plate used and the speed above indicated is appropriate for a disk of approximately 28 inch diameter. Once the variables of disk diameter and speed are set, however, the rate of feed must be carefully maintained within very close limits because contact time for a given particle with the liquid mist is very low. This low contact time permits the use of a low power source, 3 h.p. being sufficient to power a 28 inch disk in rotation.

Set forth below in tabular form are the results of coating tests made upon various granular materials. Utilized in these tests was a pilot machine of the type of FIGURE 1, having a plate outer diameter of approximately 30 inches, driven in rotation at from 900 to 1,000 r.p.m., and giving an output of approximately 3,000 lb. of coated material per hour.

| Material | Size | Liquid | Percent by Wt. | Coverage |
|---|---|---|---|---|
| Diatomaceous Earth. | 20-30 mesh | Dye and Kerosene. | 25 | Complete. |
| Do | do | do | 10 | Do. |
| Do | do | do | 5 | Do. |
| Do | 325 mesh | do | 25 | Do. |
| Carbon | 10 Micron | do | 25 | Do. |
| Saw Dust | Coarse | do | 20 | Do. |
| Cotton Seed | | Oil | .013 | Do. |
| Wheat | | do | .015 | Do. |
| Bird Seed Mix | | do | .012 | Do. |
| Sun Flower Seed. | | do | .012 | Do. |
| Fertilizer Pellets | 8 mesh | do | .011 | Do. |
| Diatomaceous Earth. | 15-30 | Hot Heptaclor. | 10 | Do. |
| Do | do | do | 20 | Do. |
| Wheat Flour | | Water | 100 | Smooth mix. |

It is a further object of this invention to provide an apparatus, as above described, capable of applying a substantially uniform surface coating to granular materials with a minimum of loss of the coating material, thereby achieving a high degree of efficiency and permitting of accurate control of the quantity of coating material to be applied.

A still further object of this invention is to provide an apparatus, as described, which in addition to having utility as a coating apparatus and such applications as granule coating, seed coating, and dust blending, is effective as a pelletizer, i.e. in the controlled agglomeration of the material granules or particles for build-up into pellets.

Yet another object of the invention is to provide an apparatus of the character described, wherein the rate of output, as well as the proportion of coating material to treated solids, is easily and accurately controlled, and which is relatively simple in design, quiet in operation, and requires a minimum of power.

And still a further object of this invention is to provide a highly efficient rotary liquid atomizing or pump element which may break up such difficulty handled materials as cold, or highly viscous, honey and emit them as mists.

Other objects and advantages of this invention will become apparent from the following description when taken in conjunction with the drawings, in which:

FIGURE 1 is a view in vertical section illustrating the embodiment of the invention having particular utility as a granule coater.

FIGURE 2 is a view in side elevation, partially broken away to show in section interior details of a modification of the invention having utility as a pelletizer.

FIGURE 3 is a view in vertical section of a modification of the invention which incorporates a substantially flat lower, or mixing plate and is useful as a granule coater.

FIGURE 4 is a view in section of another modification of the invention, rather similar to that of FIGURE 1, but having particular utility as a granule coater.

FIGURE 5 is a view in plan of the embodiment of FIGURE 4.

FIGURE 6 is a detailed view in plan of the distributor plate of the FIGURE 4 embodiment.

FIGURE 9 is a view in end elevation of yet another invention modification carried upon a support framework, such view being partially broken away to illustrate in section a resilient target curtain, or skirt, depending from the framework, together with the apparatus drive means.

FIGURE 11 is a view in elevation, partially broken away to illustrate in section the interior details of an invention modification having utility for the coating of granules and incorporating coating material attenuating means together with means for driving a scraper blade in rotation relative to the saucer-shaped lower plate.

FIGURE 12 is a view in perspective, partially broken away to illustrate the bottom-ported supply chamber of the FIGURE 11 embodiment.

FIGURE 13 is a view in vertical section of a modification of the invention useful as a seed coater and in which is incorporated a crown or star-shaped coating material dispersal plate.

FIGURE 14 is a view in plan of the coating material dispersal plate incorporated in the embodiment of FIGURE 13.

FIGURE 15 is yet another modification of the invention which, like that of FIGURE 13, has particular application to seed coating, but which additionally incorporates an annular attenuating wier or baffle for 360° dispersal of the coating material.

Figure 7:
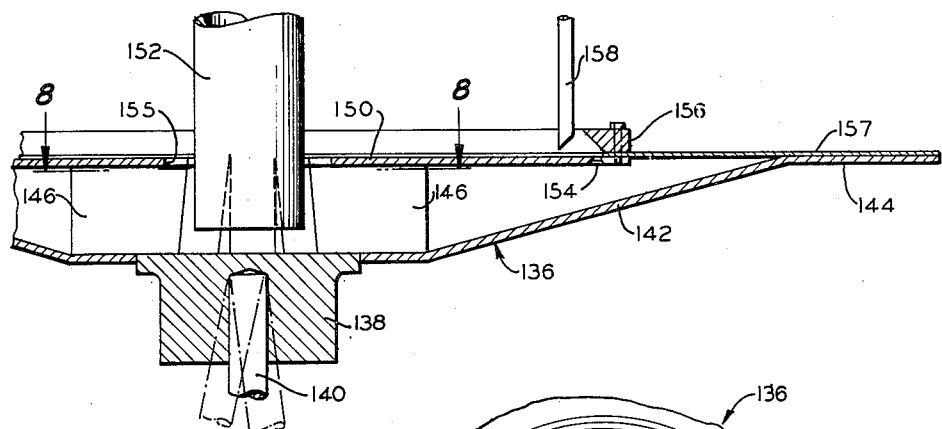
FIGURE 7 is a view in vertical section of a further modification of the invention, incorporation radially disposed passageways for the distribution of granular material onto the lower plate for coating.

Referring now to the figures, there is shown in FIGURE 1 an embodiment of the invention which has particular utility as a granule coater and is comprised of an electric motor 16 through a vertical shaft 18 secured, as by keying, to a hub 20 of frustoconical shape. A circular lower, or mixing plate 22 of saucer-shape is secured in flush-fitting relationship with the hub lower face being secured thereto by means of screws 24 in an annular groove of rectangular cross section provided in said face. The plate 22 includes an upwardly and outwardly extending annular intermediate mixing portion 26 and a horizontal annular bounding lip 28 beneath which latter extends a resilient annular flap 30 secured to lip 28 by means of an underlying notched annular gripper ring 32 and screws 34 threadedly retained therein and disposed about the periphery of lip 28. Flap 30 is preferably resilient in nature and may be constructed of materials such as nylon, rubber, nylon coated with rubber, or stainless steel suitably fabricated for flexure.

Carried atop hub 20 for rotation therewith is a feed assembly which comprises a flat circular distributor plate 36 fixedly secured by means of screws 38 atop hub 20 in an annular groove provided therefor in a fashion similar to that incorporated in securing plate 22 to the hub lower face. Plate 36 is provided with a plurality of relatively large apertures 40 and relatively small frusto-conical apertures 42 arranged in concentric rings in a manner similar to that illustrated for a like distributor plate of an invention modification shown in FIGURES 5 and 6 and presently to be described. A flanged frusto-conical collar 44 is secured centrally of plate 36 by means of screws 46 which also carry at their lower ends an undercut passage-defining annular ring 48 in underlying abutting relationship with the distributor plate 36. An interiorly undercut ring member 50 is secured to plate 36 immediately adjacent and outwardly of apertures 42 by means of screws 52, with the undercut surface of the ring projecting above said apertures. Clamped securely between ring member 50 and plate 36 is a flexible annular flap 54 which is preferably of a resilient material similar in character to that of flap 30 and at its outer margin in abutment with same.

A vertical central feed tube 56, fixed against rotation, extends downwardly into collar 44 with its lower or discharge end positioned adjacent the top of hub 20 interiorly of distributor plate apertures 40. An adjustable collar such as that utilized in conjunction with the central feed tube of the FIGURE 10 embodiment may be used for governing the rate of material flow through tube 58. A second, or outer vertical feed tube 58 in communication with a supply source (not shown) and of considerably smaller diameter than the central feed tube 56, is radially displaced outwardly from tube 56 being similarly supported against rotation. If desired, outer feed tube 58 may be supported in the fashion of FIGURE 9 for up and down movement within a collar for the purpose of governing the rate of flow of material therethrough. The discharge end of tube 58 is positioned closely adjacent distributor plate 36 interiorly of the outer row of frusto-conical apertures 42, and is bevelled thereat for directing the material discharged from the tube in the same direction as the path of travel of the portion of the distributor plate immediately therebelow when such plate is driven in rotation by motor 16.

In FIGURE 2 is shown a modification of the invention which is useful as a pelletizer and which differs from the embodiment of FIGURE 1 in provision for counter-rotation of its lower, or mixing plate 60 and its distributor plate 62 together with associated assemblies. Support for the pelletizer is provided by means of a framework 64 of inverted U-shape. Lower plate 60 is secured by means of peripherally disposed screws 66 to a horizontally extending flange of hollow outer shaft 67, which latter is journaled for rotation in bearings 68 secured to the framework 64 and driven in rotation by means (not shown) through sheave 70 fixedly secured to said shaft. Plate 60, like its counterpart of FIGURE 1, is of saucer-shape with an inclined intermediate mixing portion 72 and a horizontally extending outer lip 74; however, unlike plate 22 of that figure, it carries no flexible lower bounding flap. A central vertical shaft 76 is concentrically disposed within hollow outer shaft 67 being journaled for rotation in bearings 78 secured interiorly of the latter. A sheave 80 driven in rotation by means (not shown) is fixedly secured at the lower end of shaft 76 for effecting its rotation. The remainder of the construction of the pelletizer is substantially similar to that of the granule coater of FIGURE 1. Thus, a frusto-conical hub 82 is fixedly secured to the upper end of vertical shaft 76, as by keying, and carries thereabove a distributor ring 84 provided with a plurality of apertures 85 and 87 arranged in concentric rings has secured thereto an upstanding frusto-conical collar 86, and in abutting relationship an undercut annular ring 88, and an annular undercut ring 90. Interposed between distributor plate 62 and ring 90 is a resilient annular flap 91, the outer portion of which is in abutment with lip 74 of plate 60.

Material feed is provided through a central feed tube 92 and an outer feed tube 94, each in communication with feed means (not shown) and supported as above indicated for the embodiment of FIGURE 1.

In FIGURE 3 is illustrated another modification which, like the embodiment of FIGURE 1, has particular utility as a granule coater. As will be observed, this unit differs from that of FIGURE 1 in incorporating a flat circular lower plate 96 in lieu of the saucer-shape lower plate there shown. Plate 96 is flush-fitted with the lower face of hub 98 in an annular recess provided therefor which is of sufficient depth to accommodate an annular facing or cover ring 100 comprised of a resilient material such as nylon, or rubber, and serving as a facing for the lower plate, overlying substantially its entire area. Annular distributor plate 102, flush-fitted atop hub 98 like plate 36 of FIGURE 1, is provided with an inner ring of relatively large apertures 104 and an outer concentric ring of substantially smaller frusto-conical apertures 106. Plate 102 is additionally provided with a down-turned annular outer skirt 108 to the outer margin of which is secured by means of an annular clamping ring 110 and peripherally disposed spaced apart screws 112, a resilient annular flap 113 disposed in closely spaced parallel relation with the underlying facing 100 of lower plate 96. A frusto-conical collar 114 is secured centrally of plate 102 and an annular interiorly undercut ring 115 is secured about the outer margin of plate 102 with its undercut face projecting above the frusto-conical apertures 106. Feed tubes 116 and 118 are vertically disposed in the fashion of the feed tubes above described and are similarly in communication with supply means (not shown).

The embodiment of FIGURE 4, constituting another invention modification, is closely similar to that of FIGURE 1, but has primary utility as a seed coater and differs from the FIGURE 1 embodiment in the means of securing its distributor plate 120 to hub 122, i.e. by welding or the like in lieu of the use of screws, and in the use of a feed tube 124 outwardly turned at right angles near its lower end to achieve the directional effect provided for in FIGURE 1 through the bevelled cut of the discharge end of tube 58. A further distinction from the embodiment of FIGURE 1 appears in the elimination of an underlying flexible peripheral flap at the outer margin of lower mixing plate 125. In FIGURES 5 and 6, the distributor plate 120 is illustrated with apertures 126 and 128 arranged in concentric rings in the fashion of the distributor plates above described. Shown in FIGURE 5 positioned atop the distributor plate 120 in concentric relationship are a frusto-conical hub 129, an undercut ring 130 and a flexible flap 131. A flanged cylindrical collector skirt 132, from which depends a resilient cylindrical target curtain 134, embraces the granule coater unit for collection of material centrifugally ejected from about the unit periphery.

In FIGURE 7 is illustrated a further modification of the invention which has particular utility in the coating of granules and utilizes a saucer-shape lower plate 136 secured, as by welding, to a flanged hub 138, in turn secured atop an eccentrically mounted shaft 140 driven in rotation by means (not shown). The inclined intermediate portion 142 of plate 136 is outwardly bounded by a horizontally extending annular lip 144.

Figure 8:
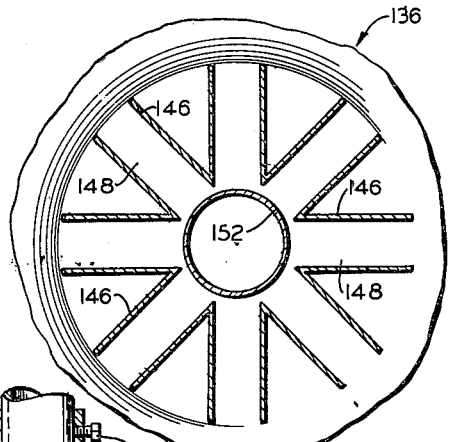
FIGURE 8 is a view in section taken on the line 8—8 of FIGURE 7.

Upstanding web members 146 define a plurality of radially extending passageways 148 (FIGURE 8) and support, in grooves provided therefor, a distributor plate 150. Each of the members 146 is slightly undercut at its inner end to provide for wobble movement of the hub-carried assembly about the stationary upstanding feed tube 152, the latter in communication with feed means (not shown), when the concentric shaft 140 is driven in rotation. Plate 150 is provided at its outer periphery with a plurality of frusto-conical apertures 154 disposed within a ring concentric with the plate and with a relatively large central aperture 155. An annular ring 156 is secured atop the distributor plate 150, being positioned such that its interiorly undercut inner face projects about the apertures 154. Secured at its inner margin between ring 156 and plate 150 is a flexible flap 157, the outer portion of which is in abutment with the underlying lip 144 of plate 136. A stationary upright feed tube 158, in communication with feed means (not shown), is displaced radially outward of the stationary feed tube 152 with its discharge end positioned adjacent to and interiorly of the ring of apertures 154. The discharge end of tube 158 is bevelled to perform as similar tubes above described, i.e. to direct the discharging material in the direction of path of travel of the adjacent portion of the distributor plate. Support for feed tubes 152 and 158 may be provided as described above in conjunction with like tubes in the other invention embodiments.

Figure 10:
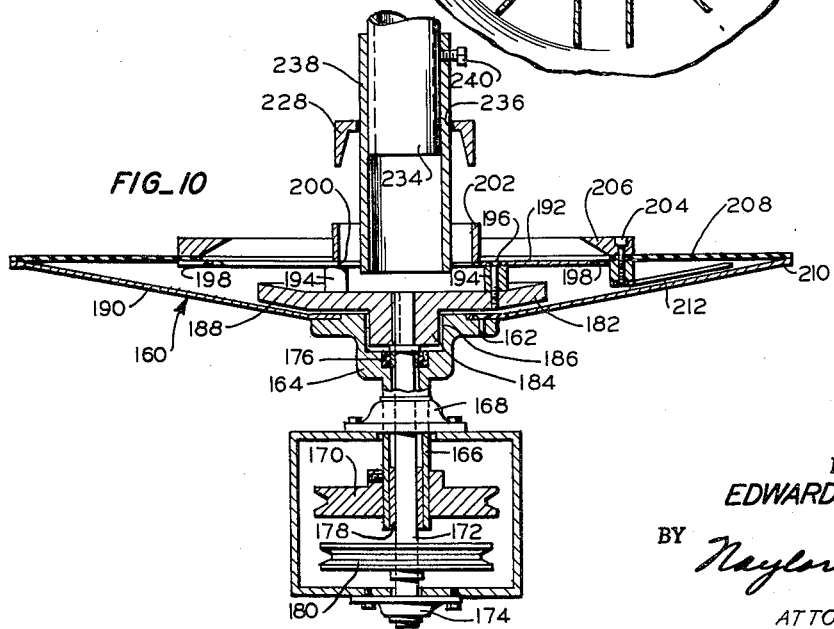
FIGURE 10 is a view taken on the line 10—10 of FIGURE 9 illustrating in detail the invention embodiment of FIGURE 9.

In FIGURES 9 and 10 is shown an invention embodiment for the coating of granules in which provision is made for relative rotation between the upper or feed assembly and the lower or mixing assembly disposed therebelow, the latter including a saucer-shaped lower, or mixing plate 160 secured, as by screws 162, in an annular groove of flanged hub 164 for a flush fit with the hub upper face. Hub 164 is fixedly secured to the upper end of an upright hollow outer shaft 166 which is journaled in bearing block 168 to be driven in rotation through sheave 170 fixedly secured to said shaft.

The upper or feed assembly includes a center shaft 172 concentrically disposed within shaft 166 and journaled in bearing block 174 and bearings 176 and 178 for driving in rotation through sheave 180 fixedly secured to said shaft. An upper hub 182 is fixedly secured to the upper end of shaft 172 with its downwardly extending central boss 184 received within a central recess 186 provided therefor in hub 164. The outer portion 188 of hub 182 is obliquely upturned and in substantially parallel relationship with the underlying inclined intermediate portion 190 of plate 160. A circular distributor plate 192 is carried atop hub 183 by means of spacer sleeves 194 and screws 196 passed therethrough for threaded retention in said hub. Like the distributor plates above described, plate 192 is provided with a plurality of spaced apart frusto-conical apertures 198 arranged in a ring near its outer margin. It differs therefrom, however, in provision of a central aperture 200 and a centrally disposed upwardly extending cylindrical member 202. Secured atop distributor plate 192 by means of screws 204 are an internally undercut annular ring 206 and a flexible annular flap 208. Both said ring and flap are essentially similar to corresponding parts described above in their makeup and disposition. The outer margin of flap 208 is in abutment with the underlying horizontal lip 210 of plate 160. There is additionally secured beneath the distributor plate 192 by means of one of the screws 204 a radius rod scraper arm 212 which is parallel with the underlying portion 190 of plate 160.

In FIGURE 9 is shown the embodiment of FIGURE 10 supported upon a framework 214 comprised of pairs of parallel spaced apart upright legs 216—216 and 218—218 atop which are carried opposed parallel members 220—220 and 222—222. Rectangular plates 224 disposed at opposite sides of the support framework 214 extend between members 220 and 222 being fixedly secured thereto, as by welding, and carry upstanding members 226 which in turn carry therebetween an inverted channel support member 228. A hopper 230 is carried atop member 228 by opposed upright flanged members 232 and a central feed tube 234, vertically aligned with shaft 172, depends from the hopper extending through the aperture 236, FIGURE 10, provided in the support member 228. Slidably disposed about the lower end of central feed tube 234 is a collar 238 fixed in position by means of a set screw 240 and movable up and down for the purpose of varying the rate of flow from feed tube 234 onto hub 182 below. An outer feed tube 242 is vertically disposed adjacent the intermediate portion 190 of mixing plate 160 being carried within an upright sleeve member 244 secured atop member 228. Like central feed tube 234, tube 242 is permitted up and down movement for the purpose of adjusting the rate of flow of material therethrough being fixed in position by means of a set screw 246 threaded in sleeve member 244. There is secured beneath member 228 by means of screws 248 a circular backup member 250 having a down-turned annular flange 252 from which latter interiorly depends an annular resilient target curtain 254 having a relatively large central aperture 256, said target curtain extending downwardly to a position within the mouth of collector hopper 258. Hopper 258 into which the coated granules fall after impingement against target curtain 254 is cradled between and fixedly secured to opposed framework members 220.

Means provided for driving the plate 160 and the upper feed assembly in rotation include a motor 260 carried upon a support bracket 262 which is in turn secured to a framework member 222. Carried at the upper end of drive shaft 260 are a pair of sheaves 264 and 266, the latter being of slightly lesser diameter than the former. Endless V-belts 268 and 270 are entrained respectively about sheaves 264 and 170 and 266 and 180 driving the above described plate and feed assembly in the same direction of rotation but at different speeds for reasons hereinafter to be described in conjunction with operation of the unit.

In FIGURE 11 an invention modification useful as a granule coater is shown which comprises a mixing plate 272 of saucer shape secured to a hollow shaft 274 and having a centrally recessed hub 276, an intermediate inclined portion 278 and a horizontally directed annular lip 280.

The upper or feed assembly is carried for rotation upon an upright central shaft 282 concentrically disposed within shaft 274 and journaled in bearings 284 and 286. The feed assembly includes a hub 288 having a downwardly extending central boss which is received within the recess of the mixing plate hub 276. A distributor chamber 290 is secured atop hub 288 by means of screws 292 passed through spacer sleeve 294 and is defined by a centrally apertured circular plate 296 from which upwardly extends a central cylindrical member 298 to embrace the lower end of a central feed tube 300, fixed against rotation, and an annular flanged member 302 having a plurality of radially extending apertures 304 about its lower end. A circular plate 306 having a relatively large central aperture 308 is secured atop member 302 by means of screws 310 and has secured about its periphery by means of screws 312 an annular ring 314 of rectangular cross section. Secured between ring 314 and plate 306 is an annular flexible flap 316, the outer margin of which abuts the mixing plate 272. Like similar flaps described above, flap 316 is preferably of a flexible material such as nylon. Also carried by plate 306 near its outer margin is a radius rod scraper arm 318 which is secured beneath said plate by means of screws 320 and extends closely parallel to the adjacent underlying portion 278 of mixing plate 272.

An annular member 322 of channel-shaped cross section, illustrated in detail in FIGURE 12, is secured to central feed tube 300 by means of a set screw 324 and extends downwardly through the aperture 308 in plate 306 to form a supply chamber 326 disposed within chamber 290 and provided at its bottom with a plurality of apertures 327. Member 322, with release of set screw 324, is permitted up and down movement upon feed tube 300 and thereby serves to control the rate of flow of material from said supply chamber through apertures 327 into the embracing distributor chamber 290.

Driving means for the above described assemblies includes an electric motor 328 driving through a gear box 330 and in which are provided suitable gears (not shown) for driving the above described mixing plate 272 in rotation through shaft 274 and the upper feed assembly through central shaft 282, the feed assembly thus rotating about the fixed central feed tube 300 and the supply chamber 326 formed by member 322 secured thereto.

In FIGURE 13, is shown a further modification of the invention which has particular utility for the coating of seeds and comprises a lower saucer-shaped mixing plate 332 flush-fitted and secured through screws 334 in an annular groove of hub 336 which is in turn fixedly secured to hollow upright shaft 338 driven in rotation by means (not shown). Mixing plate 332 is similar to a number of the mixing plates previously described having an intermediate inclined portion 340 and a horizontally extending lip 342. However, in this embodiment the mixing plate 332 serves to carry the feed assembly thereabove, the latter including a cylindrical receiver or collector hood 344 secured to the mixing plate lip 342 through bolts 346 passed through spacer sleeves 348 and end secured by means of nuts 350. The hood 344 is provided with a centrally disposed upstanding cylindrical flange 352 and carries therebelow a centrally apertured circular plate 354 by means of screws 356 passed through spacer sleeves 358. An upright central feed tube 359 is fixedly secured to plate 354 adjacent the plate central aperture in an annular groove provided therefor.

A star-shaped dispersal plate 360, illustrated in detail in FIGURE 14 as having a plurality of obliquely disposed upwardly extending triangular members 362, is fixedly secured atop upright shaft 364 for rotation therewith by means of a nut 366 threaded upon the upper end of the shaft. Triangular members 362 are disposed at an angle of about 45° with respect to the horizontal. Shaft 364 is vertically aligned with central feed tube 359 and journalled in bearing 368 to be driven in rotation by means (not shown). Independent rotation is thus permitted the dispersal plate 360 and the mixing plate 332 and feed assembly carried thereby.

In FIGURE 15 is shown a further modification. A typical saucer-shaped plate 370 is secured for rotation to a hollow shaft 372, and includes a hub 374 having a central recess 376, and inclined intermediate portion 378 and a horizontally disposed annular lip 380. Positioned above the plate 370 is the feed assembly which includes a hub 382 having a downwardly extending central boss 384 received within the hub recess 376 and secured for rotation to central shaft 386, the latter journalled for rotation in bearings 388 and 390. Carried atop hub 382 by means of spacer sleeves 392 and screws 394 passed therethrough is a distributor chamber 396 defined at its lower end by a horizontally disposed circular plate 398 having a central aperture 400 and an upper surface bevelled near its outer margin and provided with a plurality of concentric annular grooves of rectangular cross section for reception of members hereinafter described. An annular groove is further provided about the outer margin of the under surface of plate 398 for the reception in flush-fitting relationship with said under surface of a crown-shaped dispersal plate 402 having a plurality of oblique upwardly extending triangular members 404 arranged in the fashion of members 362 illustrated in FIGURE 14. An upright cylindrical member 406 substantially defines the inner boundary of chamber 396 and is secured atop plate 398 within a surface groove thereof to embrace the lower end of a stationary upright central feed tube 408, the latter in vertical alignment with coaxially disposed shafts 372 and 386 therebelow. The outer boundary of chamber 396 is defined by an annular upright flanged member 410 fitted within an annular groove in the upper surface of plate 398 and provided with a plurality of radially extending apertures 412 disposed near its lower end. Interposed between chamber bounding members 406 and 410 and similarly fitted within an annular surface groove of plate 398 is an upright cylindrical wier 414. An annular supply chamber 416 is formed by a member 418 of block S cross section which member is secured by means of a set screw 420 to central feed tube 408 such that chamber 416 is received within chamber 396 interiorly of wier 414 and outer portion 422 of member 418 forms a skirt in spaced overlying relationship with wier 414, creating a passageway for flow therebetween of material emanating from chamber 416. But for the skirt-forming outer portion 422, member 418 is similar to the chamber-forming member of FIGURE 11, having a plurality of apertures 424 disposed about its bottom for passage of the coating material. Variation in the rate of flow of material from chamber 416 through apertures 424 into chamber 396 is similarly provided for by permitting up and down movement of member 418 upon central feed tube 408, set screw 420, as previously indicated serving to secure said member to the tube.

There is secured to flanged member 410 by means of screws 426 a circular plate 428 provided with a central aperture 430 by sufficient diameter to permit movement of member 418 therethrough. An annular ring 432 is secured about the outer margin of plate 428 by means of screws 434; and a flexible annular flap 436, similar in nature to flaps previously described, is secured between said ring and plate with its extreme outer margin in abutment with the underlying plate 370.

In an arrangement similar to that of FIGURE 11, the plate 370 and the feed assembly carried atop hub 382 are driven in rotation through a gear box 438 by means of a motor (not shown).

The above invention embodiments rely upon centrifugal action for achieving the intimate intermixing of the feed materials required for effective results. Thus, in each of these embodiments there are provided means which permit the lower or mixing plate to be driven in rotation as materials for intermixing are fed thereto from feed means disposed thereabove. Rotation for the feed assembly of each unit disposed above its lower plate is also provided for; and in certain of the embodiments, namely, those of FIGURES 2, 10, 11 and 15, relative rotation between the feed assembly and the plate is provided for. Support for the invention embodiments may be substantially as illustrated in FIGURE 9 with supply, target curtain or discharge and collecting means arranged as therein indicated, or in other suitable fashion as desired. It will be noted that the construction of each of the units is relatively simple and the similarity of structural details in a number of the embodiments permits a standardization of parts for manufacturing and replacement purposes.

In describing in detail the operation of each of the illustrated embodiments above described, those units adapted for similar use will be grouped together.

The embodiments of FIGURES 1, 3, 7, 10, 11 and 15 have particular utility for the coating of granules wherein it is required that the coating be uniform and adequate, without agglomeration or mudding up and without granule breakdown.

In the embodiment of FIGURE 1, with the upper feed assembly and the lower plate driven as a unit in rapid rotation by motor 16 through shaft 18, the granules to be coated are deposited by the stationary central feed tube 56 centrally of distributor plate 36. Directed by collar 44, such granules move downwardly through the apertures 40 and the frusto-conical passageway formed between the hub 20 and ring member 48, being ultimately deposited upon mixing portion 26 of plate 22.

At the same time, the fluid coating material is fed from the stationary outer feed tube 58, impinging upon the undercut surface of member 50 to be atomized thereby and directed downwardly through frusto-conical apertures 42 as the member 50 and the apertures 42 rapidly pass said feed tube.

Although not wishing to be limited to any particular theory of operation in describing this or any of the other invention embodiments, it is believed that the granular coating is effectively accomplished in the following manner. The granules in moving downwardly onto the inclined portion 26 of mixing plate 22 are subjected to a so-called "Sinden effect" (see Patent 1,597,393) i.e., the granules upon striking the plate are caused to rapidly accelerate, quickly reaching the velocity of the plate. Such rapid acceleration has the beneficial effect of preventing granules build-up on the plate since the granules are positioned on the plate as a result thereof in substantially a single layer. During this rapid acceleration, the particles are caused to rotate due to the relative motion between them and the plate 22 and at the same time are urged radially outward of the plate under the influence of centrifugal force and a peripheral pumping effect, hereinafter more fully described.

Simultaneously, the atomized coating material is sprayed from frusto-conical apertures 42 to be deposited upon the plate mixing portion 26 outwardly of the area in which the granules are deposited upon plate 22. As the coating material impinges upon the surface of portion 26, it is caused by the centrifugal force generated by the rotation of the plate to attenuate into a generally annular film encompassing the area of deposit of the granules upon plate 22. The rotating granules, urged outwardly by centrifugal force, move through this film to be uniformly coated with the coating material, thereafter to pass into contact with intermediate flaps 30 and 54. The coated granules ultimately impinge upon a target curtain of the type illustrated in FIGURES 4 and 9 and drop therefrom into a hopper or other suitable collector means. As previously indicated, a major problem in coating granules with a liquid is the tendency of the granules to break down and become mushy. By passing the granules rapidly upward in a single layer through the attenuated film of coating material, the rolling granules pick up an optimum amount of moisture, acquiring a substantially uniform surface coverage without penetration of the coating material to an extent sufficient to cause granule breakdown and mushing. As thus coated, the granules upon contacting flaps 30 and 54 are retarded in their outward movement and any granules which may have agglomerated are separated in their passage between such flaps. The target curtain upon which the coated granules impinge after passage from between said flaps is preferably of the construction and arrangement of those of FIGURES 4 and 9 and of a resilient material to prevent granule breakdown or agglomeration.

The operation of the FIGURE 1 embodiment, as above described, is substantially typical of the other granule coater embodiments of this invention, each relying more or less upon the so-called "Sinden effect" for the effective and rapid exposure of the granules to the attenuated coating material without causing granule breakdown, mushing, or attenuation. In practice it has been found that with a plate 22 of 30 inch outer diameter and a feed tube 56 of 2 inch inner diameter spaced from hub 56 approximately 3/16 inch, the unit output capacity is approximately 1800 lbs. of coated material per hour when the plate 22 is driven in rotation at approximately 900 r.p.m. The foregoing dimensions and the unit capacity are by way of illustration only and should in no wise be construed as a limitation on the invention.

Two important factors in the above operation, more or less applicable to all of the invention embodiments, should be mentioned at this juncture, namely, the pumping action of the unit and the water hole effect, the latter as bearing upon noise generation in the use of liquids as coating materials. In its rapid rotation, the unit typically pumps a high quantity of air from about its outer margin drawing the granules onto plate 22 and radially outward thereof promoting their rolling and further atomizing the coating material sprayer from the apertures 42. Since the sound generated during normal operation as a result of the above water hold effect lies in the supersonic range, the only substantial audible noise occurs during unit start-up when there is audible a low-pitched whistle.

The granule coater embodiment of FIGURE 3 is believed to operate in a manner similar to that of FIGURE 1 with the unit being driven in rapid rotation and the granules passing from a stationary central feed tube 116 through the apertures 104 in distributor plate 102 and downwardly about the frusto-conical hub 98 for deposit upon facing ring 100, disposed atop plate 96. The coating material is delivered by the stationary outer feed tube 118 to impinge against the undercut interior surface of ring 115 being atomized for passage through apertures 106 and ultimate attenuation upon plate facing ring 100.

The "Sinden effect" of the FIGURE 1 embodiment is somewhat reduced in the instant case by the flattening of the plate 96; and the granules impinging thereon have a tendency to skid, which tendency is countered in part by the ring 100 of resilent facing material. Flap 113 in conjunction with the closely adjacent outer margin of ring 100, like flaps 30 and 54 of FIGURE 1, furnishes the above described retarding and anti-agglomeration effect on the coated granules as they pass therebetween to impinge against a resilient target curtain for subsequent collection in a hopper or like suitable means.

The granular coater of FIGURE 7, like those above, is driven in rapid rotation and is believed to operate in a manner similar thereto. Thus, the granules are delivered by stationary central feed tube 152 centrally of hub 138 to be uniformly distributed by means of the passages 148 onto inclined portion 142 of plate 136. The granules thereupon move outwardly of the plate inclined portion for passage between flap 157 and lip 144 and discharge from the plate.

The simultaneous deposition of the coating material on the portion 142 outward of the area for granule deposition is effected through the media of stationary outer feed tube 158, ring 156 and distributor plate 150—all functioning in the manner previously described for like elements of FIGURES 1 and 3.

A feature of the FIGURE 7 embodiment is its use of a shaft 140 mounted eccentrically to effect a wobble in the plate 136 and the assembly which it carries. As the shaft 140 is driven in rotation by means (not shown) to effect such wobble, the flexible flap 157, through the action of centrifugal force, is maintained in a substantially fixed plane, being substantially unaffected by the wobble imparted to the unit by the eccentric mounting of the shaft.

The previously described "Sinden effect" characterizing operation of the above-described embodiments is similarly applicable here and the vibratory or wobble movement imparted to the plate 136 by eccentric shaft 140 prevents agglomeration of the granules and adherence thereof to the plate. The total stroke of the plate 136 at its lip outer margin may suitably be in the vicinity of .040 inch where the plate is of an outer diameter of approximately 30 inches.

The granule coater embodiment of FIGURE 10, although generally similar in its operation to the coaters described above, in addition incorporates provision for relative rotation between the plate 160 and the feed assembly carried atop upturned hub 182, which relative movement is easily effected in the manner of FIGURE 9 by means of a single motor 260 driving two sheaves 264 and 266 of different diameters secured to a common shaft. Since the primary purpose of such relative rotation is to effect a wiping movement of the scraper arm 212 over the immediately adjacent upper surface of the plate portion 190 in order to prevent granule agglomeration and adherence of the granules to plate portion 190, the rate of relative movement of such assemblies need not be great. In practice it has been found satisfactory to drive the feed assembly at approximately 8 to 12 r.p.m. faster than the speed of revolution of the underlying plate 160, although such relative rotation may of course be varied as desired to suit any particular opening conditions.

As in the above embodiments, granule feed is from a stationary central feed tube 234 in communication with a hopper 230, FIGURE 9, from which is supplied the granular material for coating. Adjustable collar 238 permits controlled variation in the rate of flow of the material from the hopper and serves to direct the granules centrally of hub 182. As previously indicated, this flow adjusting feature may be incorporated into any of the various embodiments of this invention as desired. After deposit upon the hub 182, the granules move outwardly, being discharged therefrom onto plate intermediate portion 190 where, subject both to rolling and to a "Sinden effect," they move radially outward of the plate for discharge between lip 210 and flap 208.

Feed for the granule coating material is the same as previously described, with an outer feed tube 242 in communication with supply means (not shown) directing the coating material against the undercut surface of ring 206 for atomization and subsequent direction through apertures 198 onto plate 160. The rate of flow of the coating material through outer feed tube 242 is adjusted in a manner somewhat analogous to that for central feed tube 234, releasable support being by means of set screw 246 threaded within the sleeve 244. As with the central feed tube support arrangement, this means of support may be incorporated with like feed tubes in the other invention embodiments.

The granule coater of FIGURE 11 is similar to that of FIGURES 9 and 10 in its provision for relative rotation of the feed assembly and the scraper arm 318 carried thereby to effect a scraping action in moving closely adjacent the mixing plate 272 disposed therebelow. In practice it has been found that with a speed of approximately 900 r.p.m. imparted to the mixing plate 272, a speed of approximately 912 r.p.m. for the feed assembly is satisfactory to give the desired wiping action and prevent objectionable granule agglomeration of build-up on the plate. However, such speeds are by way of example only and not to be construed as invention limitations. Such rotation is accomplished by means of motor 328 driving through gear box 330 to concentric upright shafts 274 and 282 which respectively effect rotation of the lower plate 272 and the feed assembly disposed thereabove.

Granule feed is through the stationary central feed tube 300 which deposits the granules upon the central portion of the hub 288 for movement outwardly and discharge onto plate inclined portion 278. As above indicated, the effective coating action of the unit is thought to result in large part from the resulting rotation of the granules and the "Sinden effect" imparted thereto as the granules travel outward upon the rotating plate 272 and through the attenuated coating material thereon. Discharge of the coated granules between lip 280 and overlying abutting flap 316 subjects the coated granules to the typical retardation and antiagglomeration effect aforementioned in connection with the other embodiments of the invention.

The coating material flow is downwardly from supply chamber 326 through apertures 327 and into the embracing distributor chamber 290, from whence it is radially discharged through apertures 304 onto the outer portion of plate 296 for discharge onto portion 278 of plate 272, outwardly of the area wherein the granules are deposited upon hub 288.

The pelletizer of FIGURE 2 in its flow pattern for the granules and the coating material therefor is closely similar to the FIGURE 1 granule coater embodiment. Thus, the granules are discharged from stationary central feed tube 92 to move downwardly through apertures 85 and the frusto-conical passageway formed hub 82 and ring 88 onto plate portion 72 where, subjected to rolling and the above-described "Sinden effect," they are covered with the coating material discharged from feed tube 94, such material having been atomized by impingement with ring 90 and fed through apertures 87 to the plate for attenuation.

The difference in the embodiments of FIGURES 1 and 2 lies in the provision in the latter for contrarotation of the lower or mixing plate 60 and the upper feed assembly to effect a pelletizing action about the plate outer margin in the area of the lip 74, as hereinafter described.

Plate 60 is driven in rotation by means of a power source (not shown) driving through shaft 67 and sheave 70 secured thereto and the upper assembly carried atop hub 82 is driven in an opposite direction of rotation by means (not shown) driving through shaft 76 and sheave 80. Lip 74 and the flap 91 closely adjacent thereto are thereby caused to move in opposite directions. It is believed that the effect of such movement on granules moving between the flap and the lip is to cause a spinning of the granules about their own axes. Should such assemblies be travelling at like speeds of rotation but in opposite directions, the granules will be subject to no centrifugal force as the result of such assembly movement and will simply spin, absent other forces. Such spinning has the effect of causing coating material build-up on the spinning granules with a pellet of increased size the result. The relative speeds of rotation of the two assemblies may be varied as desired with approach to the above condition of equal speeds of rotation in opposite directions giving the maximum spinning of the granules and hence the most effective granule pelletizing.

Discharge of the pelletized granules may be effected in the usual fashion with impingment against a target curtain and collection in suitable means adjacent thereto.

The embodiments of FIGURES 4 and 13 are of primary utility as seed coaters where agglomeration and material breakdown is not such a problem as above and the requirement of adequate dispersal of the coating medium is a primary consideration. The embodiment of FIGURE 15 is primarily desirable as a continuous blender, e.g. a liquid-solid blender for granule coating, but it may also be used as a seed coater in instances where the outer shells of the seeds are tough and not liable to break when seed impacts seed at the target curtain under high speed operation of both plate elements 378 and 398.

Little need be said with reference to the embodiment of FIGURE 4, its operation being similar to that of the FIGURE 1 embodiment, which it closely resembles but for the rigid outer lip of its lower plate 125 and the right angle bend in its coating material feed tube 124. In lieu of granule feed through its central stationary feed tube, seeds are fed therethrough onto the plate 125 for coating, being similarly subject to rotation and the "Sinden effect" described above although the latter is not so pronounced inasmuch as the speed of rotation of the plate is considerably reduced, a speed of approximately 80 r.p.m. having been found satisfactory for effecting the seed coating operation. Seed discharge from between flap 136 and the horizontal outer lip of plate 125 is against a resilient target curtain 134.

The FIGURE 13 embodiment is characterized by slow rotation of the lower plate 332 and the feed assembly and collector hood 344 which it carries and by a rapid rotation of the dispersal plate 360. Suitable speeds of revolution for the respective assemblies have been found to be in the vicinity of 80 r.p.m. and 3600 r.p.m., although these speeds are merely suggested and not limitations on the invention.

Feed of the seeds is downwardly through the upright cylindrical flange 352 onto underlying plate 354 in the direction of the arrows, the seeds discharging from about the outer periphery of plate 354 to fall onto the inclined portion 340 of mixing plate 332, from whence the seeds travel outwardly for discharge about the periphery of plate 332 from its lip 342.

The coating material is fed from central feed tube 354 onto the dispersal plate 360 which, driven in rapid rotation, atomizes the coating material through the action of its triangular elements 362, dispersing it over a considerable height range, the coating material then being directed radially outward as indicated by the arrows to traverse the path of travel taken by the seeds dropping onto the plate 332. The seeds in falling through such blanket of atomized coating material receive a certain amount of coverage before ever reaching the plate 332, where the coating operation is completed. The area of deposit of the atomized coating material is relatively large and extends considerably outward of the area wherein seeds are deposited on the plate, thereby assuring adequate association between the seeds and such material and proper seed coating prior to seed discharge from the plate.

In the coater of FIGURE 15 the hub 382 is driven at a relatively high speed of rotation, e.g. 900 r.p.m., through central shaft 386 and carries with it in rotation plate 398 and the dispersal plate 402 secured thereto. At the same time mixing plate 370 is driven in rotation through shaft 372 in the same direction as the hub 382 at a relatively high speed of rotation with the solid feed being discharged onto plate portion 378 from about the periphery of hub 382, to which latter such feed is initially fed from stationary central feed tube 408. As indicated, the solid feed moves up the inclined portion 378 of plate 370, ultimately to pass between flap 436 and plate 370 for discharge to collecting means (not shown).

Flow of the liquid coating material is in the direction indicated by the arrows, i.e., from supply chamber 416 through apertures 424 into chamber 396, between cylindrical wier 414 and skirt portion 422 of member 418, and out of chamber 396 through apertures 412. Like the machine of FIGURE 13, that of FIGURE 15 utilizes a dispersal plate 402 with triangular members 404 for atomizing and dispersing the liquid coating material into a substantial height range for impingement upon the solid feed moving upwardly upon the plate portion 378. Thus, with passage from apertures 412, the liquid passes outwardly to engage elements 404 of the dispersal plate. However, unlike the FIGURE 13 embodiment, the solid feed is not dropped through a blanket of spray onto the mixing plate. It may be noted that the wier 414 assures 360° dispersal of the coating material, necessary because of the off-center feed of the coating liquid.

The flexible lip elements, such as 436 of that of FIGURE 15, apparently serve another important purpose. Under a high rate of solid feed condition, i.e. where the particles or granules tend to choke the outlet, the flexible lip together with the "choke effect" of the granules inhibits free outlet of excess liquid, thereby creating a vapor chamber effect within the mixing chamber.

The liquid break-up element of FIGURE 14 may be employed as a highly efficient liquid atomizer or pump, even outside of the environment of blender apparatus of the type described. For instance, cold, or highly viscous, honey, when dropped on this element when it is rotated at a speed of about 7800 r.p.m. seems to disappear. But when a polished metal plate is held adjacent the periphery of the spinning disc, it is found that a fog-like deposit, much like the familiar condensation of water vapor on a bathroom mirror, is formed on the plate. Thus difficultly handled liquids may be finely divided, apparently to a maximum degree, by use of the liquid handling element of FIGURE 14.

It will be appreciated that the embodiments of this invention as herein described may be altered, changed or modified without departing from the scope of the invention as herein claimed.

What is claimed is:

1. A coating apparatus comprising, in combination, a mixing plate concave at its upper side adapted to be driven in rotation about a vertically disposed axis, means for depositing a first material upon the upper surface of the mixing plate and for directing said material radially outward of the plate, and means for depositing a second material upon the upper surface of the mixing plate outwardly of the location of deposition of the first material for commingling therewith, said mixing plate upper surface having a horizontal dimensional component in excess of its vertical dimensional component.

2. A coating apparatus comprising, in combination, a mixing plate concave at its upper side adapted to be rotatably driven about a vertically disposed axis, means for depositing a first material upon an inner portion of the mixing plate and for directing said first material outwardly of the plate over a substantially continuous arc of 360°, and means for depositing a second material upon the mixing plate outwardly of said area of deposition of the first material for intimate intermixing with said first material when the plate is powered in rotation to urge said first material outwardly thereof, said mixing plate upper side having a horizontal dimensional component in excess of its vertical dimensional component.

3. A coating apparatus comprising, in combination, a mixing plate concave at its upper side adapted for rotation in a horizontal plane about a substantially vertical axis, means for depositing a first material upon the upper surface of the mixing plate a substantial distance outwardly from the axis of plate rotation and for directing said material radially outward of the plate, and means for depositing a second material upon the upper surface of the mixing plate outwardly of the location of deposition of the first material for mixing therewith, said mixing plate upper surface having a horizontal dimensional component in excess of its vertical dimensional component.

4. A coating apparatus comprising, in combination, a horizontally disposed rotatable mixing plate concave at its upper side, means for depositing a first material upon the upper surface of the mixing plate a substantial distance outwardly from the axis of plate rotation and for directing said material radially outward of the mixing plate, means for depositing a second material upon the upper surface of the mixing plate outwardly of the location of deposition of the first material for commingling therewith, and means for driving the mixing plate in rotation at a speed sufficient to uniformly distribute the second material about the upper surface of the plate and to cause the outward movement of the first material into commingling relationship with the deposited second material, said mixing plate upper surface having a horizontal dimensional component in excess of its vertical dimensional component.

5. A coating apparatus comprising, in combination, a mixing plate concave at its upper side adapted to be rotatably driven about a vertically disposed axis, means for depositing particle material upon an inner portion of the upper surface of the mixing plate a substantial distance outwardly from its axis of rotation and for directing said first material outwardly of the plate over a substantially continuous arc of 360°, means for depositing liquid material upon the upper surface of the mixing plate outwardly of said location of deposition of the particle material for commingling with the said particle material, and means for driving the mixing plate in rotation at a speed sufficient to effect a substantially uniform distribution of the liquid material over an annular portion of the upper surface of the plate and to cause the outward movement of the particle material into commingling relationship with the liquid material as thus uniformly distributed, said mixing plate upper surface having a horizontal dimensional component in excess of its vertical dimensional component.

6. A coating apparatus comprising, in combination, a horizontally disposed rotatable mixing plate, concave at its upper side, means for feeding a first material onto the upper surface of the mixing plate a substantial distance outwardly from the axis of plate rotation and for uniformly distributing the same in a substantially continuous arc of 360° and for directing said material toward the plate outer margin, means for feeding a second material onto the upper surface of the mixing plate outwardly of the area of said feed of the first material, and means for driving the mixing plate in rotation at a speed sufficient to cause the first material fed to the plate to move outwardly thereof and into commingling relationship with the second feed material fed onto the plate, said mixing plate upper surface having a horizontal dimensional component in excess of its vertical dimensional component.

7. The combination of claim 6, wherein at least a portion of the first material is directed by its feed means into commingling relationship with at least a portion of the second material prior to the deposition of either of said portions of the first and the second materials onto the mixing plate.

8. A coating apparatus comprising, in combination, a horizontally disposed rotatable mixing plate of saucer shape having a mixing portion inclined upwardly in the direction of the plate outer margin, means for depositing a first material upon said mixing portion and for directing the same outwardly of said portion, and means for depositing a second material upon said mixing portion outwardly of the location for said deposition of the first material and for intimate intermixing therewith as the plate is driven in rotation to urge the first material outwardly thereof, said mixing plate mixing portion having a horizontal dimensional component in excess of its vertical dimensional component.

9. A coating apparatus comprising, in combination, a horizontally disposed rotatable mixing plate of shallow saucer shape having an annular mixing portion gently inclined in an upward direction, means for depositing a first material near the lower end of the mixing portion, and means for depositing a second material outwardly of the area of deposition of the first material for commingling with the latter material as the plate is driven in rotation to urge the first material outwardly of the plate and into commingling relationship with the second material, said mixing plate mixing portion having a horizontal dimensional component in excess of its vertical dimensional component.

10. A coating apparatus comprising, in combination, a vertically disposed shaft mounted for rotation, a hub fixedly carried by the shaft, a relatively shallow dished mixing plate secured to the hub for rotation therewith and having an upwardly inclined mixing portion, a central feed tube adjacent to and in axially alignment with the hub for feeding a granular material centrally of said hub, means for directing said granular material from the hub onto said mixing portion, a distributor plate carried by the hub above the mixing plate and in spaced relationship therewith for rotation with said hub, said distributor plate being provided with a plurality of spaced apart frusto-conical apertures arranged in a ring near its outer margin at locations immediately above the inclined mixing portion of the mixing plate, an interiorly undercut annular ring member secured to the distributor plate outwardly of said ring of frusto-conical apertures such that its undercut surface inclines above said apertures, an annular flexible flap fixedly secured intermediate the distributor plate and the annular ring member and extending outwardly therefrom to a position immediately above the mixing plate near the upper end of its inclined mixing portion, and a feed tube positioned adjacent to and interiorly of the ring of apertures for feeding a liquid against the undercut surface of the ring member for atomization and direction downwardly through the frusto-conical apertures onto the mixing portion of the mixing plate for coating the granular material.

11. The combination of claim 10, wherein means are provided for rotatably driving the mixing plate at a speed sufficient to effect substantially uniform 360° distribution of the liquid over a segment of the mixing portion of the mixing plate.

12. The combination of claim 10, wherein the means for directing the granular material from the hub onto the mixing portion of the mixing plate includes a plurality of relatively large apertures provided in the distributor plate and arranged in a ring adjacent the hub for receipt and passage of said granular material downwardly about the outer surface of the hub.

13. The combination of claim 12, wherein the hub is of frusto-conical shape and said means for directing the granular material from the hub onto the mixing portion of the mixing plate further includes an annular undercut ring secured beneath the distributor plate immediately adjacent to and outwardly of said inner ring of apertures, serving thereby to define with the frusto-conical hub a continuous frusto-conical passageway for conveyance of said granular material.

14. A coating apparatus comprising, in combination, a support, a vertically disposed hollow outer shaft journaled for rotation within the support, means for driving the outer shaft in rapid rotation, a mixing plate of saucer shape secured to the shaft for rotation therewith and having an upwardly inclined mixing portion, a central shaft journaled for rotation within the hollow outer shaft, means for driving the central shaft in rapid rotation at a speed differing from that of the outer shaft, a hub secured to the central shaft for rotation therewith and positioned closely adjacent to and in overlapping relationship with the mixing plate, feed means for delivering a first material centrally of said hub for direction and distribution thereby onto the mixing portion of the mixing plate, feed means for delivering a second material onto the mixing portion of the mixing plate for commingling with the first material, scraper means carried by the second material feed means for movement closely adjacent the mixing portion of the mixing plate for preventing buildup of said first and second materials upon the mixing plate, and an annular flap carried by the second material feed means in immediately overlying relationship with the mixing plate near the upper margin of its mixing portion.

15. The combination of claim 14, wherein the first material feed means is in communication with a hopper carried thereabove by the support, and wherein a collector hood, from which depends a resilient target curtain, is disposed above the mixing plate for receipt and collection of the first and second materials ejected from about the perimeter of said plate, and a collector hopper, carried by the support, is disposed below the mixing plate for receiving said materials from the hood and target curtain above.

16. The combination of claim 14, wherein the feed means for the second material includes an annular distributor chamber having an outer wall about the lower margin of which are distributed a plurality of apertures which serve to direct the second material toward the mixing portion of the mixing plate, a second material supply chamber disposed within the distributor chamber having a plurality of apertures distributed about its bottom and being adjustably secured to the first material feed means for axial movement relative to the distributor chamber for the purpose of governing the rate of flow of the second material from said supply chamber through its bottom apertures into the distributor chamber.

17. A coating apparatus comprising, in combination, a vertically disposed hollow outer shaft adapted to be rotatably driven, a saucer shaped plate concave at its upper side carried by the outer shaft for rotation therewith having an upwardly inclined mixing portion, a central shaft journaled within the hollow outer shaft for rotation independent of said outer shaft and carrying therewith a dispersal plate of crown shape having a plurality of upturned triangular members disposed about its perimeter, means for feeding a first material onto the mixing portion of the mixing plate, and means for feeding a second material onto the dispersal plate for dispersal and delivery over a substantial height range to the mixing portion of the mixing plate for commingling with the first material as said first material moves outwardly of the mixing plate in response to rotation thereof.

18. The combination of claim 17, wherein said second material feed means includes a central tube disposed above and in axial alignment with the dispersal plate for delivery of the second material centrally of said dispersal plate, and wherein the first material in its movement onto the mixing portion of the mixing plate is directed by the first material feed means to traverse the path of travel of at least a portion of the second material moving onto the mixing portion of the mixing plate.

19. A coating apparatus comprising, in combination, a vertically disposed hollow outer shaft adapted to be rotatably driven, a saucer-shaped mixing plate carried by the outer shaft for rotation therewith having an upwardly inclined mixing portion, a central shaft journaled within the hollow outer shaft for rotation independent of said outer shaft, a hub carried for rotation by the central shaft having an outwardly projecting annular flange in overlapping relationship with the inner portion of the mixing plate, a central feed tube axially aligned with the hub for delivery of a first material centrally thereof for passage outwardly and discharge onto the mixing portion of the mixing plate, means carried by the hub for rotation therewith for dispersing and delivering a second material to the mixing portion of the mixing plate over a considerably height range, which dispersing and delivering means includes an annular distributor chamber having an outer wall about the lower margin of which are distributed a plurality of apertures for directing the second material toward the mixing portion of the mixing plate, a cylindrical wier disposed within the chamber for attenuating the second material contained within the distributor chamber prior to its emission therefrom through the apertures in the distributor chamber outer wall, and flexible flap means carried by the second material feed means to extend into a position immediately above the mixing plate in the vicinity of the upper margin of the mixing portion of said plate.

20. The combination of claim 19, wherein there is positioned within the distributor chamber a supply chamber for delivering the second material to the distributor chamber through a plurality of apertures provided in the bottom of the supply chamber, and wherein an annular passageway is formed within the distributor chamber for conveying the second material received into the distributor chamber from the supply chamber outwardly over the wier.

21. The combination of claim 20, wherein dispersal and distribution of the second material to the mixing portion of the mixing plate is effected by means of a dispersal plate of crown shape encircling the distributor chamber and having a plurality of upturned triangular members disposed about its periphery and against which the second material emitted through the apertures of the distributor chamber outer wall impinges.

22. A coating apparatus for the pelletizing of a granular material comprising, in combination, a horizontally disposed mixing plate of saucer shape having an upwardly inclined mixing portion and a bounding lip, means for driving the mixing plate in rotation, feed means for delivering a granular material to the mixing portion of the mixing plate and for delivering a liquid to said mixing portion outwardly of the area of delivery of the granular material for intermixing with said granular material as the latter moves outwardly of the plate in response to plate rotation, flap means carried by the feed means for rotation therewith in overlapping immediacy with the mixing plate lip, and means for driving the feed means in rotation in a direction opposite to the direction of rotation of the mixing plate.

23. A coating apparatus for the pelletizing of a granular material comprising, in combination, a support, a vertically disposed hollow outer shaft journaled within the support for rotation at high speed, a mixing plate of saucer shape carried by the outer shaft for rotation therewith and having an upwardly inclined annular mixing portion bounded at its outer margin by an annular lip, a central shaft journaled within the hollow outer shaft for rotation at high speed independent of and in a direction opposite the direction of rotation of the outer shaft, means secured for rotation to the central shaft for delivering a granular material onto the mixing portion of the mixing plate, means secured for rotation to the central shaft for delivering a liquid onto the mixing portion of the mixing plate outwardly of the area of said delivery of the granular material, and a flexible annular flap carried by the liquid delivering means, a substantial portion of which flap is disposed immediately above the mixing plate lip for movement relative thereto as the central shaft and the outer shaft are driven in opposite directions of rotation.

24. A coating apparatus for the pelletizing of a granular material comprising, in combination, a support, a vertically disposed hollow outer shaft journaled for rotation within the support, a mixing plate of saucer shape carried by the outer shaft for rotation therewith having an upwardly inclined mixing portion and an outer bounding annular lip, a central shaft journaled for rotation within the hollow outer shaft and carrying for rotation therewith a hub, a central feed tube in axial alignment with the hub for depositing a granular material centrally thereof, a distributor plate secured to the hub for rotation therewith above and in spaced relationship with the mixing plate having a plurality of frusto-conical apertures arranged in a ring near its outer margin above the mixing portion of the mixing plate and a plurality of relatively large apertures located interiorly of said ring of frusto-conical apertures, an interiorly undercut annular ring member secured to the distributor plate outwardly of said ring of frusto-conical apertures such that its undercut surface inclines above said frusto-conical apertures, an annular flexible flap carried by the distributor plate and extending outwardly therefrom to closely overlap a substantial portion of the lip of the mixing plate, an outer feed tube positioned adjacent to and interiorly of the ring of apertures for feeding a liquid against the undercut surface of the ring member for atomization and direction downwardly through the frusto-conical apertures onto the mixing portion of the mixing pltae for coating the granular material as said granular material moves up the inclined mixing portion of the mixing plate to be pelletized upon passage between the mixing plate lip and the closely overlying flap moving in opposite directions with the rotation of the mixing plate and the distributor plate.

25. Material blending apparatus comprising an annular plate mounted in a horizontal attitude on shaft means for rotation therewith, said plate having a surface which is upwardly and outwardly inclined to make the upper side of said plate dished in form, means for feeding a relatively finely divided solid material onto the inner portion of said plate surface for movement outwardly over said surface under the influence of rotative movement of said shaft means, and means for feeding a relatively finely divided liquid material onto the outer portion of said plate surface for commingling with said solid material, said mixing plate surface having a horizontal dimensional component in excess of its vertical dimensional component.

26. Material blending apparatus comprising a horizontally disposed and rotatably mounted annular first plate having an outer portion which is upwardly and outwardly inclined to make the upper side of said plate dished in form, means for feeding a relatively finely divided material of granule-like form onto said plate for movement over the outer portion thereof under the influence of rotative movement, a horizontally disposed and rotatably mounted annular second plate co-axially disposed with respect to said first plate and located above said first plate, said second plate being of substantially lesser diameter than said first plate and terminating in an upwardly and outwardly inclined rim portion which is notch-relieved to define a plurality of spaced tooth-like tabs, the portion of said first plate disposed outwardly of said tabs having a vertical heighth component which is at least as great as the vertical heighth component of said tabs, and means to feed a liquid to be blended with said finely divided material onto said second plate.

27. In material handling apparatus, an annular plate and means including a shaft for driving said plate at a high rotational velocity, means for delivering a liquid against said plate, and peripheral means carried by said plate for causing said liquid to be whirled off of said plate in finely divided form, said peripheral means comprising a rim portion for said plate which is angularly inclined upwardly relative to said plate and composed of a plurality of spaced apart tabs, said tabs defining with the surface of said plate against which said liquid is delivered included angles less than 180° and greater than 90°.

28. The combination of claim 27, said tabs being triangular in form, with the outer ends thereof defining the apices of the triangles.

29. Material handling apparatus comprising an annular plate mounted in a horizontal attitude on shaft means for rotation therewith, said plate having a surface which is upwardly and outwardly inclined to make the upper side of said plate dished in form, means for feeding a relatively finely divided solid material onto the inner portion of said plate surface for movement outwardly over said surface under the influence of rotative movement of said shaft means, and means for whirling a liquid material substantially horizontally onto a substantial outer areal portion of said plate surface for commingling with said solid material, said mixing plate surface having a horizontal dimensional component in excess of its vertical dimensional component.

30. A coating apparatus comprising, in combination, comprising a vertically disposed first shaft, a saucer shaped plate concave at its upper side carried by said first shaft for rotation therewith and having an upwardly inclined mixing portion, means for rotatably driving said first shaft and said plate, a vertically disposed second shaft disposed coaxially with respect to said first shaft and carrying therewith a dispersal plate of crown shape having a plurality of upturned triangular members disposed about its perimeter means for rotatably driving said second shaft independently of said first shaft, means for feeding a first material onto the mixing portion of the mixing plate, and means for feeding a second material onto the dispersal plate for dispersal and delivery over a substantial height range to the mixing portion of the mixing plate for commingling with the first material as said first material moves outwardly of the mixing plate in response to rotation thereof.

References Cited in the file of this patent

UNITED STATES PATENTS

| | | |
|---|---|---|
| 2,561,392 | Marshall | July 24, 1951 |
| 2,561,395 | Marshall | July 24, 1951 |
| 2,584,424 | Cornell | Feb. 5, 1952 |
| 2,704,220 | Stokland | Sept. 15, 1959 |

FOREIGN PATENTS

| | | |
|---|---|---|
| 6,471 | Netherlands | Oct. 4, 1921 |